United States Patent [19]

Hudson

[11] 4,296,022

[45] Oct. 20, 1981

[54] POLYPROPYLENE BLEND COMPOSITIONS

[75] Inventor: Robert L. Hudson, Severna Park, Md.

[73] Assignee: Chevron Research, San Francisco, Calif.

[21] Appl. No.: 156,521

[22] Filed: Jun. 4, 1980

[51] Int. Cl.$^3$ .............................................. C08L 23/12
[52] U.S. Cl. ................................ 260/42.46; 525/240; 264/DIG. 29; 260/45.95 R
[58] Field of Search ................. 525/240; 260/45.95 R, 260/42.46; 264/DIG. 29.

[56] References Cited

U.S. PATENT DOCUMENTS 3,112,300  11/1963  Natta et al. ........................... 525/240
3,261,820  7/1966  Natta et al. ........................... 525/240
3,464,954  9/1969  Tholstrup ........................... 260/45.95

OTHER PUBLICATIONS

Journal of Applied Polymer Science, vol. 18, No. 8, Aug. 1974, p. 2427 "Barus Effect in Nylon & Polymer Melts", Ishibashi.

Primary Examiner—Carman J. Seccuro
Attorney, Agent, or Firm—J. A. Buchanan, Jr.; T. G. DeJonghe; L. S. Squires

[57] ABSTRACT

A blend of different polypropylene resins which is particularly useful in melt-spinning fine denier yarns. The blend can be melt-extruded into pellets having better spinning properties for melt-spinning fine denier yarns than the individual resins.

5 Claims, No Drawings

POLYPROPYLENE BLEND COMPOSITIONS

BACKGROUND OF THE INVENTION

1. The Invention

This invention relates to methods of melt-spinning fine denier polypropylene filaments using novel resin blends or pellets made from such blend.

2. Prior Art

The general melt-spinning of polypropylene into fibers is, of course, well known to the art; see, for example, U.S. Pat. Nos. 3,705,227; 3,233,023; 3,560,604; and 3,663,675.

The quality of polypropylene resin used to melt-spinning fine denier yarns (e.g. 40–600 denier/with 40 to 200 filaments per yarn and especially for 40–200 denier yarns) is very important. Generally, this quality refers to the size or molecular weight of the particular polymers composing the resin and the narrowness of the distribution of such polymers. Thus, a good spinning resin will in theory be composed of polymers of about the same size or molecular weight (or within a narrow range) whereas a poor spinning polymer will have a wide range of different sized polymers. In actual practice molecular weights are seldom referred to but rather the criterion for melt-spinnability is expressed in terms of "swell" and melt flow index. As used herein, the term "melt flow index" refers to the grams of polymer that flow through a specified orifice at a standard temperature and pressure; see ASTM D-1238-65T. The term "swell" or "swell index" refers to the ratio of the cross-sectional area of the extruded filament immediately after exit from the spinnerette to that of the spinnerette; see Journal of Applied Polymer Science, 18, No. 8, 2427, 1974. In practice it has been found that for melt-spinning good quality fine denier yarns the resin polymer (or the compounded resin polymer) should have a melt flow index of about from 30 to 38 and a swell of 2.8–3.4. If the "swell" is not great enough, the extruded filaments do not have the necessary elasticity and do not draw properly. It should also be noted that this quality requirement, although especially critical for spinning fine denier yarns, is not nearly so stringent for higher denier yarns.

A further problem is that the resin, whether supplied as a powder or pellet, is generally compounded with color pigments, etc. and then repelleted. The use of color pigments further reduces the "swell" and thus places even greater requirements on the quality of the initial resin.

Generally, polypropylene is sold in two principal grades or qualities. The first grade is referred to herein as C.R. (Controlled Rheological properties) and has been subjected to visbreaking, following polymerization, to narrow the molecular distribution and is generally intended to have melt flow indices of about 30 to 38 and a "swell" of around 3. In practice, however, the "swell" of this material is frequently below this and after compounding with pigments, is even lower. Frequently this problem is appreciated only after drawing difficulties are obtained, thus necessitating discarding the already spun fiber, or scrap recycling it, and using the remaining resins for less demanding uses. The melt flow index of the resin C.R. resin is generally adequate and insured by the prior art's use of about 0.05 to 0 weight percent, of a melt flow stabilizer.

The second or lower grade of polypropylene is referred to as reactor grade and has not been subjected to visbreaking and has a broad molecular weight distribution and generally undergoes extensive thermal degradation during melt-pelleting or melt-spinning. Reactor grade resin typically has a broad melt flow index, of about from 8 to 35, and generally has a fairly large swell of about 5 to 7.

SUMMARY OF THE INVENTION

The present invention provides a method for preparing a polypropylene formulation or pellet of sufficient quality to be melt-spun into fine denier yarns which makes use of C.R. grade resin of insufficient quality for melt-spinning fine denier yarn and reactor grade resin, also too poor of quality for melt-spinning good quality yarns.

In one aspect the invention provides a polypropylene resin mixture comprising about from 70–95 weight percent, based on total polypropylene resin, of a polypropylene resin having a melt flow index of about from 30 to 38 and a "swell" of about from 1.8 to 2.3; about from 5 to 30 weight percent, based on total polypropylene resin, of a polypropylene resin having a melt flow index of about from 4 to 35 and a swell of about from 5 to 7; and about from 0.2 to 0.5 weight percent of a melt flow stabilizer and optionally about from 0.25 to 2% of a color pigment or pigments.

In a further aspect, the invention provides a method for preparing polypropylene pellets having a melt flow index of about from 30 to 38 and a swell of 2.8–3.4 which comprises melt-extruding rods or pellets of the above mixture.

In a further aspect, the respective components of the aforedescribed mixture can be supplied directly to the inlet port of melt-spinning extruder or the respective polypropylene polymers can be pelletized with the appropriate pigments and stabilizers and then supplied in the appropriate proportion to provide the above mixture to the melt-spinning extruder.

The invention will be further described hereinbelow.

FURTHER DESCRIPTION OF THE INVENTION AND PREFERRED EMBODIMENTS

Considering the invention in greater detail, the polypropylene resin mixture of the present invention contains, based on 100 parts of total polypropylene resin, about from 70–95, preferably about from 75 to 85, parts by weight of a polypropylene resin having a melt flow index of about from 30 to 38 and a swell of about from 1.8 to 2.3; about from 30 to 5, preferably about 25 to 15 parts by weight of a polypropylene resin having a melt flow index of about from 8 to 35 and a swell of about from 5 to 7; and about from 0.2 to 0.5 parts by weight of a polypropylene melt flow stabilizer and wherein the sum of the polypropylene resins is 100 parts. Desirably, the mixture also contains about from 0.25 to 2 parts of pigment and optionally can contain fillers and small amounts of conventional additives such as, for example, light stabilizers, extrusion aids, etc. Generally, less than about 2 parts by weight of light stabilizer and less than about 2 parts of extrusion aids are used.

As used herein the term "parts" shall refer to parts by weight.

Optimum proportions will vary within these ranges, depending upon the particular resins and flow stabilizers used, and in the case of pigments upon the particular pigments used and color intensity desired, and can be obtained by routine optimization procedures.

Melt flow stabilizers are well known to the art and any suitable melt flow stabilizer or combination thereof can be used. As is well known, these stabilizers serve to retard the degradation of the polypropylene during melt spinning and melt-pelleting. A preferred class of these stabilizers are hindered phenols. Suitable hindered phenol stabilizers are, for example, sold under the Trademarks: Irganox 1076 and Irganox 2002 by the Ciba-Geigy Corporation; Good-rite 3114 by the Goodrich Corporation; and Ethyl 330 by the Ethyl Corporation. Mixtures of such stabilizers can also be used.

Especially good results are obtained using Good-rite 3114, Irgastab 2002. It should also be noted that in the compositions of the present invention it is necessary to use large amounts of melt flow stabilizer (i.e., about 0.2 to 0.5 wt. % as compared with the 0.05 to 0.1 wt. % generally used by the prior art) to maintain the proper molecular weight during melt-spinning to achieve good spinnability and obtain fibers having good drawability. The melt flow stabilizers do not prevent all polymer degradation during melt-spinning or pelleting but control it within the desired range. Some visbreaking during the melt-spinning or pelleting operation is indeed desirable to bring the very large polymers more in line with the average or medium polymer size range of the composition.

The present mixture can be used directly for melt-spinning or more desirably, is first pelleted. Pelleting can be effected by any suitable procedure, including, for example, pellet mills, melt extrusion, etc. The components of the present mixture can be blended prior to pelleting or can be initially blended as part of the pelleting operation.

Melt pelleting is especially desirable because a degree of visbreaking will occur resulting in the production of pellets having a melt flow index of about from 30 to 38 and a swell of about from 2.8 to 3.4. Thus, these pellets can be advantageously used to melt-spin fine denier yarns.

In melt-pelleting the mixture is melt-extruded at die temperatures in the range of about from 200° to 270° C. through a die as rods which are then cropped or cut into the desired pellet lengths. Typically, these pellets have diameters in the range of about from 1/16 inch to 3/16 inch and pellet lengths in the range of about 1/16 to 3/16 inch.

The resins themselves can be initially supplied as powders or pellets.

The compositions of the present invention, or pellets made therefrom, are melt-spun in the usual manner for melt-spinning polypropylene resins. The details of such procedures are well known to the art and do not form part of the present invention.

Where general or typical conditions or ranges have been given, it should be appreciated that the invention can be practiced at other ranges though generally with poorer results or economies.

A further understanding of the invention can be had from the following non-limiting examples.

EXAMPLE 1

This example illustrates the compositions of the invention and melt-pelleting the composition.

In this example a composition according to the present invention, was prepared by mixing together 79.131 parts of a polypropylene resin having a melt flow index of 35.0 and a swell of 2.3; 20.00 parts of a polypropylene resin having a melt flow index of 17.0 and a swell of 5.4; 0.25 parts of a phenolic melt flow stabilizers (sold under the trademark Good-rite 3114); 0.25 parts distearyl thiodipropionate and 0.369 parts pigment. This mixture was then melt-extruded at 218° C. through a pellet die into rods having a diameter of about ⅛ inch. The rods were then chopped into pellets. The pellets were tested and found to have a melt flow index of about 30.8 and a swell of about 2.8. The pellets are suitable for melt-spinning into fine denier fibers.

EXAMPLE 2

This example illustrates the composition of the invention and the melt-pelleting thereof.

In this example a composition, according to the present invention, was prepared by mixing together 77.55 parts of a polypropylene resin having a melt flow index of 35.0 and a swell of 2.3; 20.0 parts of a polypropylene resin having a melt flow index of 16.2 and a swell of 5.8; 0.43 parts of melt flow stabilizer (0.18 parts of Good-rite 3114 sold by the Goodrich Corp. and 0.25 parts of Irgastab 2002 sold by Ciba-Geigy Corporation); 0.72 parts of distearyl thiodipropionate and 1.3 parts of pigment. This mixture was then melt-extruded at 218° C. through a pellet die into about 1/16 inch diameter rods. The rods were then chopped into pellets. The pellets were tested and found to have a melt flow index of 31.4 and a swell of 2.9. The pellets are thus suitable for melt-spinning into fine denier fibers.

Obviously, many modifications and variations of the invention, described hereinabove and below in the claims, can be made without departing from the essence and scope thereof.

What is claimed is:

1. A polypropylene resin blend, useful for melt-spinning fine denier yarns, which comprises, per 100 parts by weight of total polypropylene resin, about from 70-95 parts of a first polypropylene resin having a melt flow index about of from 30 to 38 and a swell index of about from 1.8 to 2.3; about from 5 to 30 parts of a second polypropylene resin having a melt flow index of about from 4 to 35 and a swell index of about from 5 to 7; and about 0.2 to 0.5 parts of a hindered phenol melt flow stabilizer for retarding polypropylene polymer degradation during melt extrusion.

2. The composition of claim 1 wherein said composition comprises about from 0.25 to 2 parts of pigment per 100 parts by weight of total polypropylene resin.

3. The composition of claim 1 wherein said composition contains, per 100 parts of total polypropylene resin, about from 75 to 85 parts of said first resin and about 15 to 25 parts of said second resin.

4. The composition of claim 3 wherein said composition comprises about from 0.25 to 2 parts of pigment per 100 parts of total polypropylene resin.

5. A method for making polypropylene resin pellets having a melt flow index of about from 30 to 38 and a swell index of about from 2.8 to 3.4 which comprises melt extruding the composition of claims 1, 2, 3, or 4.

* * * * *